United States Patent
Kamran et al.

(10) Patent No.: US 11,403,036 B2
(45) Date of Patent: Aug. 2, 2022

(54) RECOVER TIME IMPROVEMENT MECHANISM AFTER DEVICE PATH FAILURE IN A STORAGE SYSTEM

(71) Applicant: EMC IP Holding Company LLC, Hopkinton, MA (US)

(72) Inventors: Lior Kamran, Rishon LeZion (IL); Alex Soukhman, Raanana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 56 days.

(21) Appl. No.: 16/790,257

(22) Filed: Feb. 13, 2020

(65) Prior Publication Data
US 2021/0255798 A1    Aug. 19, 2021

(51) Int. Cl.
*G06F 3/06* (2006.01)
*G06F 16/23* (2019.01)

(52) U.S. Cl.
CPC .......... *G06F 3/0659* (2013.01); *G06F 3/0604* (2013.01); *G06F 3/067* (2013.01); *G06F 16/2379* (2019.01)

(58) Field of Classification Search
None
See application file for complete search history.

(56) References Cited

U.S. PATENT DOCUMENTS

| | | | | |
|---|---|---|---|---|
| 2005/0097402 A1* | 5/2005 | Baba | ................... | G06F 11/2089 714/42 |
| 2007/0088978 A1* | 4/2007 | Lucas | ................. | G06F 11/2092 714/5.11 |
| 2007/0260916 A1* | 11/2007 | Nguyen | .............. | G06F 11/0778 714/13 |
| 2009/0077275 A1* | 3/2009 | Zhang | ................. | G06F 11/2007 710/38 |
| 2016/0112512 A1* | 4/2016 | Jibbe | ..................... | G06F 11/0751 709/219 |
| 2017/0017403 A1* | 1/2017 | Sekine | ..................... | G06F 3/067 |
| 2020/0278909 A1* | 9/2020 | Peterson | ............... | G06F 3/0659 |

* cited by examiner

*Primary Examiner* — Mark A Giardino, Jr.
(74) *Attorney, Agent, or Firm* — Daly, Crowley, Mofford & Durkee, LLP

(57) ABSTRACT

A method comprising: receiving, by a first storage node, an instruction to designate a first device file as the first storage node's primary device file for accessing a storage device designating, by the first storage node, the first device file as the first storage node's primary device file for accessing the storage device, the first device file being designated as the first storage node's primary device file for accessing the storage device in response to the first instruction; receiving, at the first storage node, an I/O command that is associated with the storage device; making a first attempt to complete the I/O command by using the first device file, detecting, by the first storage node, an error that is generated in response to the first attempt; designating, by the first storage node, a second device file as the first storage node's primary device file for accessing the storage device.

20 Claims, 6 Drawing Sheets

| | DEVICE ID | FIRST DEVICE FILE | SECOND DEVICE FILE | PRIMARY DEVICE FILE |
|---|---|---|---|---|
| 528-1 | 220-1 | /DEV/SSD_220_1_1 | /DEV/SSD_220_1_2 | /DEV/SSD_220_1_1 |
| 528-2 | 220-2 | /DEV/SSD_220_2_1 | /DEV/SSD_220_2_2 | /DEV/SSD_220_2_2 |
| ••• | | | | |
| 528-M | 220-M | /DEV/SSD_220_M_1 | /DEV/SSD_220_M_2 | /DEV/SSD_220_M_1 |

526

RECOVER TIME IMPROVEMENT MECHANISM AFTER DEVICE PATH FAILURE IN A STORAGE SYSTEM

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided comprising: receiving, by a first storage node, a first instruction to designate a first device file as the first storage node's primary device file for accessing a storage device, the first instruction being received from a management system; designating, by the first storage node, the first device file as the first storage node's primary device file for accessing the storage device, the first device file being designated as the first storage node's primary device file for accessing the storage device in response to the first instruction; receiving, at the first storage node, an I/O command that is associated with the storage device; making a first attempt to complete the I/O command by using the first device file, the first device file being selected for use in the first attempt based on the first device file being designated as the storage node's primary device file for accessing the storage device, detecting, by the first storage node, an error that is generated in response to the first attempt; designating, by the first storage node, a second device file as the first storage node's primary device file for accessing the storage device, the first device file being designated as the first storage node's primary device file for accessing the storage device in response to the error; and making a second attempt to complete the I/O command by using the second device file the first device file being selected for use in the second attempt based on the first device file being designated as the first storage node's primary device file for accessing the storage device.

According to aspects of the disclosure, an apparatus is provided comprising: a memory storing at least a first device file for accessing a storage device and a second device file for accessing the storage device; and at least one processor that is operatively coupled to the memory, the at least one processor being configured to perform the operations of: receiving a first instruction to designate a first device file as a primary device file for accessing a storage device, the first instruction being received from a management system; designating the first device file as a primary device file for accessing the storage device, the first device file being designated as a primary device file for accessing the storage device in response to the first instruction; receiving an I/O command that is associated with the storage device; making a first attempt to complete the I/O command by using the first device file, the first device file being selected for use in the first attempt based on the first device file being designated as the primary device file for accessing the storage device, detecting an error that is generated in response to the first attempt; designating a second device file as the primary device file for accessing the storage device, the first device file being designated as a primary device file for accessing the storage device in response to the error; and making a second attempt to complete the I/O command by using the second device file the first device file being selected for use in the second attempt based on the first device file being designated as the primary device file for accessing the storage device.

According to aspects of the disclosure, a storage system is provided, comprising: a management system; and a first storage node that is configured to perform the operations of: receiving a first instruction to designate a first device file as the first storage node's primary device file for accessing a storage device, the first instruction being received from a management system; designating the first device file as the first storage node's primary device file for accessing the storage device, the first device file being designated as the first storage node's primary device file for accessing the storage device in response to the first instruction; receiving an I/O command that is associated with the storage device; making a first attempt to complete the I/O command by using the first device file, the first device file being selected for use in the first attempt based on the first device file being designated as the storage node's primary device file for accessing the storage device, detecting an error that is generated in response to the first attempt; designating a second device file as the first storage node's primary device file for accessing the storage device, the first device file being designated as the first storage node's primary device file for accessing the storage device in response to the error; and making a second attempt to complete the I/O command by using the second device file the first device file being selected for use in the second attempt based on the first device file being designated as the first storage node's primary device file for accessing the storage device.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or write request.

Figure 1:
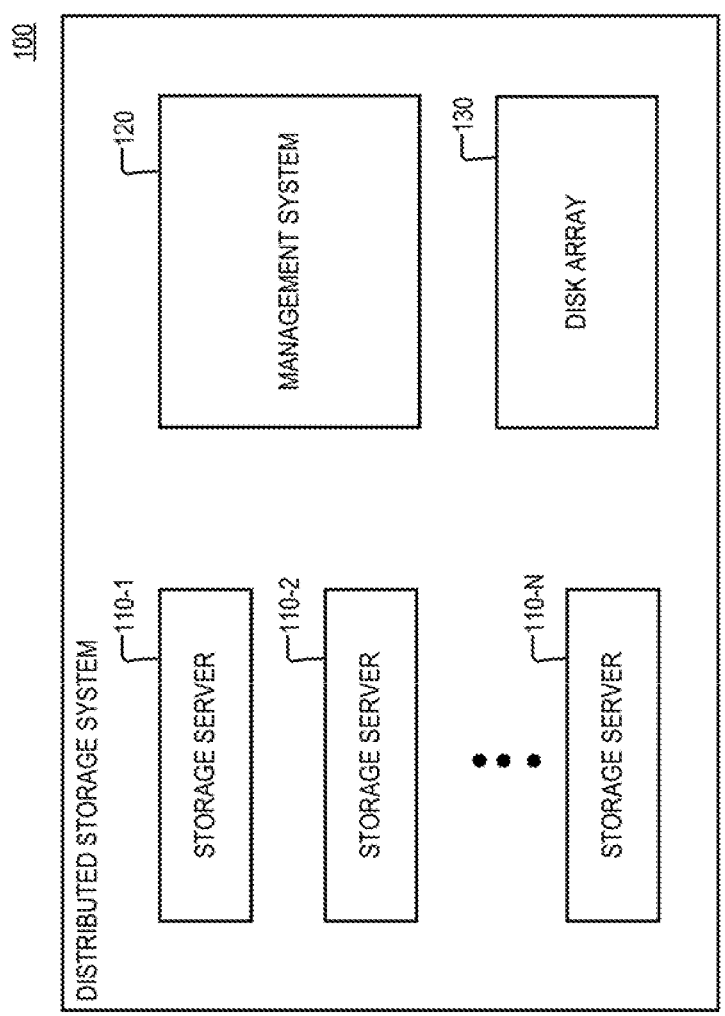
FIG. 1 is a diagram of an example of a storage system, according to aspects of the disclosure.

FIG. 1 is a diagram of an example of a storage system 100, according to aspects of the disclosure. The storage system 100 may include a midrange storage system, an enterprise storage system, and/or any other suitable type of storage system. As illustrated, the storage system 100 may include a plurality of storage servers 110-1 through 110-N, where N is a positive integer greater than 1. Furthermore, the storage system 100 may include a management system 120, and a disk array 130. Although in the example of FIG. 1 the management system 120 is depicted as being hosted on a separate computing device, it will be understood that in some implementations, the management system 120 can be hosted on one or more of the storage servers 110.

Figure 2:
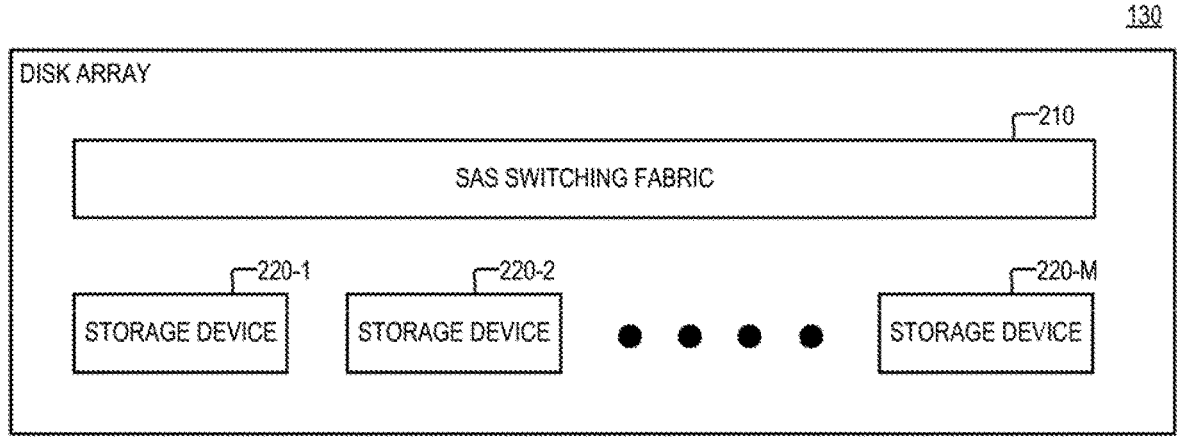
FIG. 2 is a diagram of an example of a disk array, according to aspects of the disclosure.

FIG. 2 is a diagram of an example of the disk array 130, according to aspects of the disclosure. As illustrated, the disk array 130 may include a plurality of storage devices 220-1 through 220-M and a Serial Attached SCSI (SAS) switching fabric 210, where M is a positive integer greater than 1. According to the example of FIG. 2, each of the storage devices 220 includes a Solid-State Drive (SSD). However, alternative implementations are possible in which any of the storage devices 220 includes a non-volatile random-access memory (nvRAM) device, a hard drive (HD), and or any other suitable type of storage device. The SAS switching fabric 210 may be part of a SAS interface of the disk array 130 (not shown), and it may include one or more SAS switches for connecting each of the servers 110 to any of the storage devices 220.

Figure 3:
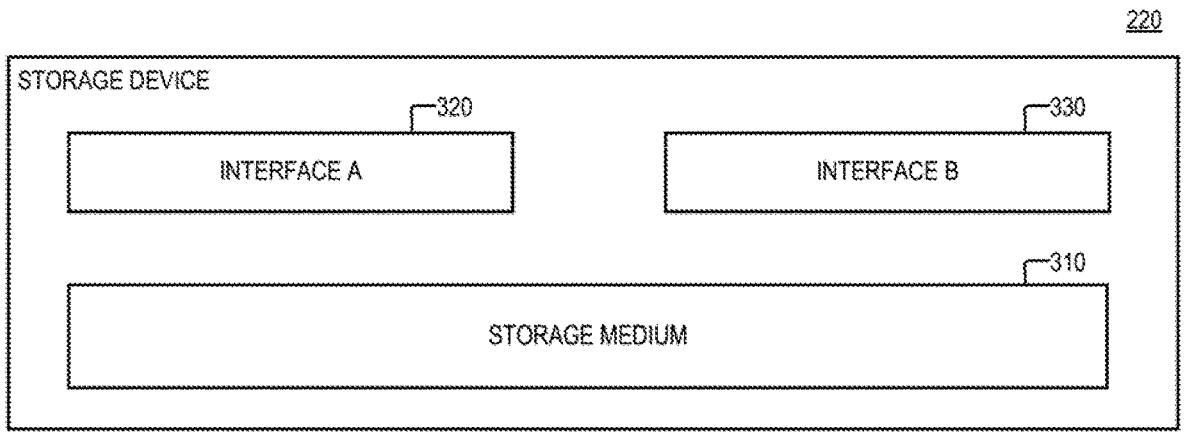
FIG. 3 is a diagram of an example of a storage device, according to aspects of the disclosure.

FIG. 3 is a diagram of an example of a storage device 220, according to aspects of the disclosure. As the numbering suggests, the storage device 220 may be the same or similar to any of the storage devices 220-1 through 220-N, which are shown in FIG. 2. As illustrated, the storage device 220 may include a storage medium 310, a first interface 320 and a second interface 330. The storage medium 310 may include an EEPROM matrix and/or any other suitable medium for storing data. The first interface 320 may include an interface for retrieving and storing data on the storage medium 310. The second interface 330 may also include an interface for retrieving and storing data on the storage medium 310. In some implementations, each of the first interface 320 and the second interface 330 may be associated with a different storage controller. Although the first interface 320 and the second interface 330 are depicted as separate entities, it will be understood that in some implementations, the first interface 320 and the second interface 330 may utilize the same physical connector for connecting to the storage servers 110 via the SAS switching fabric 210. Furthermore, although the first interface 320 and the second interface 330 are depicted as separate entities, it will be understood that in some implementations, the first interface 320 and the second interface 330 may share digital logic and be at least in part integrated with one another. Stated succinctly, the present disclosure is not limited to any specific implementation of the first interface 320 and the second interface 330.

Each of the interfaces 320 and 330 may provide (e.g., together with the switching fabric 210) a different path to any of the servers 110 for connecting to the storage device 220. When any of the servers 110 uses the first interface 320 to access the storage device 220, a first path in the switching fabric 210 may be used to access the storage device 220. By contrast, when any of the servers 110 uses the second interface 330 to access the storage device 220, a second path in the switching fabric 210 may be used to access the storage device 220. As can be readily appreciated, in some implementations, each of the first interface 320 and the second interface 330 may be accessed via a different address (e.g., SCSI address).

Figures 4A, 4B:
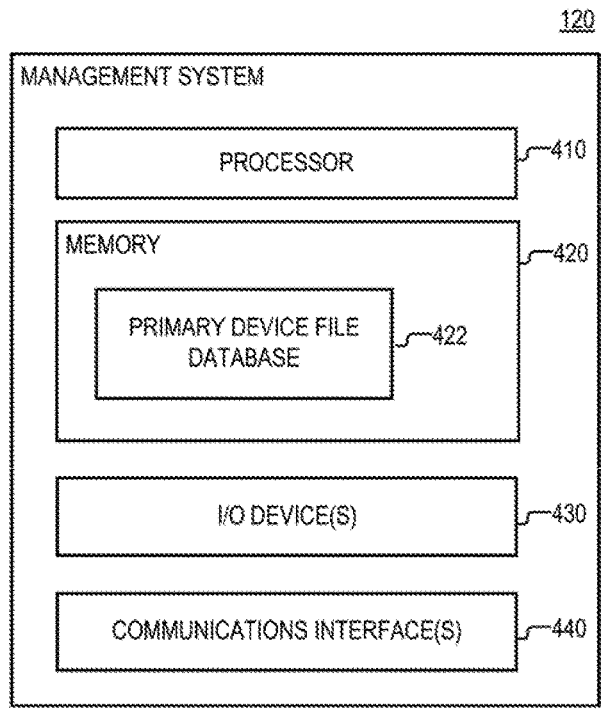
FIG. 4A is a diagram of an example of a management system, according to aspects of the disclosure.
FIG. 4B is a diagram of an example of a primary device file database, according to aspects of the disclosure.

FIG. 4A is a schematic diagram of the management system 120, according to aspects of the disclosure. As illustrated, the management system 120 may include a processor 410 that is operatively coupled to a memory 420, I/O device(s) 430, and communications interface(s) 440. The processor 410 may include one or more of a general-purpose processor (e.g., an x86 processor, an ARM-based processor, a MIPS processor), an application-specific integrated circuit (ASIC), a Field-Programmable Gate Array (FPGA), and/or any other suitable type of processing circuitry. The memory 420 may include any suitable type of volatile and/or non-volatile memory. For example, in some implementations, the Memory 420 may include one or more of a random-access memory (RAM), a read-only memory (ROM), a solid-state drive (SSD), electrically erasable programmable read-only memory (EEPROM), and/or any other suitable type of memory. The I/O device(s) 430 may include one or more of a keyboard, a mouse, a touchpad, a touchscreen, a microphone, a printer, a display device, a speaker, and/or any other suitable type of input or output device. The communications interface(s) 440 may include one or more of a Bluetooth interface, an InfiniBand interface, an Ethernet interface, a WiFi interface, a ZigBee interface, a Universal Serial Bus (USB) interface, and/or any other suitable type of interface.

The management system 120 may be arranged to store, in the memory 420, a primary device file database 422. The database 422 may include a plurality of entries 450. Each of the entries 450 may be associated with a different one of the plurality of servers 110. For example, the entry 450-1 may be associated with the server 110; the entry 450-2 may be associated with the server 110-2; and the entry 450-N may be associated with the server 110-N. Each of the entries 450 may identify a plurality of primary device files of the entry's associated server 110. Each of the plurality of primary device files may be associated with a different one of the storage devices 220. In some implementations, a server's primary device file for accessing a storage device may be the only device file that is used by the server to access the storage device until another device file is designated as a primary device file. Additionally or alternatively, in some implementations, any device file for accessing a storage device may not be used by a server to access the storage device until this device file is designated as a primary device file (of that server) for accessing the storage device.

According to aspects of the disclosure, the same plurality of device files for accessing a given storage device (or copies thereof) may be provided to each of a plurality of servers. Each of the device files may correspond to a particular interface of the given storage device. Thus, when a server uses a first device file to access storage device, the server accesses the storage device via a first interface of the storage device (which corresponds to the first device file) and/or via a first path in the switching fabric 210. When the same server uses a second device file to access the storage device, the server accesses the storage device via a second interface of the storage device (which corresponds to the second device file) and/or via a second path in the switching fabric 210. As noted above, each interface/device file of a storage device 220 may correspond to a different path for accessing the storage device. Changing the primary device file of a server for accessing a storage device 220 effectively changes the interface (and/or path in the switching fabric 210) that is used by the server to access the storage device 220. For optimal performance, it is generally preferable for the load on a storage device 220 (and/or the switching fabric 210) to be distributed evenly across the interfaces of the storage device 220 (and/or evenly across the switching fabric 210). In this regard, the management system 120 can balance the load on any of the storage devices 220 and/or the switching fabric 210 by changing the primary device files of one or more of the servers 110. Accordingly, the database 422 may help the management system 120 to keep track of the primary device file designations for each of the servers 110, and it can be used by the management system 120 for the purpose of balancing the load on the storage devices 220 and/or the switching fabric 220.

According to the example of FIG. 4B, the entry 450-1 may identify: (i) a device file that is used by the server 110-1 as a primary device file for accessing the storage device 220-1; (ii) a device file that is used by the server 110-1 as a primary device file for accessing the storage device 220-2; and (iii) a device file that is used by the server 110-1 as a primary device file for accessing the storage device 220-M. The entry 450-2 may identify: (i) a device file that is used by the server 110-2 as a primary device file for accessing the storage device 220-1; (ii) a device file that is used by the server 110-2 as a primary device file for accessing the storage device 220-2; and (iii) a device file that is used by the server 110-2 as a primary device file for accessing the storage device 220-M. And the entry 450-N may identify: (i) a device file that is used by the server 110-N as a primary device file for accessing the storage device 220-1; (ii) a device file that is used by the server 110-N as a primary device file for accessing the storage device 220-2; and (iii) a device file that is used by the server 110-N as a primary device file for accessing the storage device 220-M.

Figures 5A, 5B:
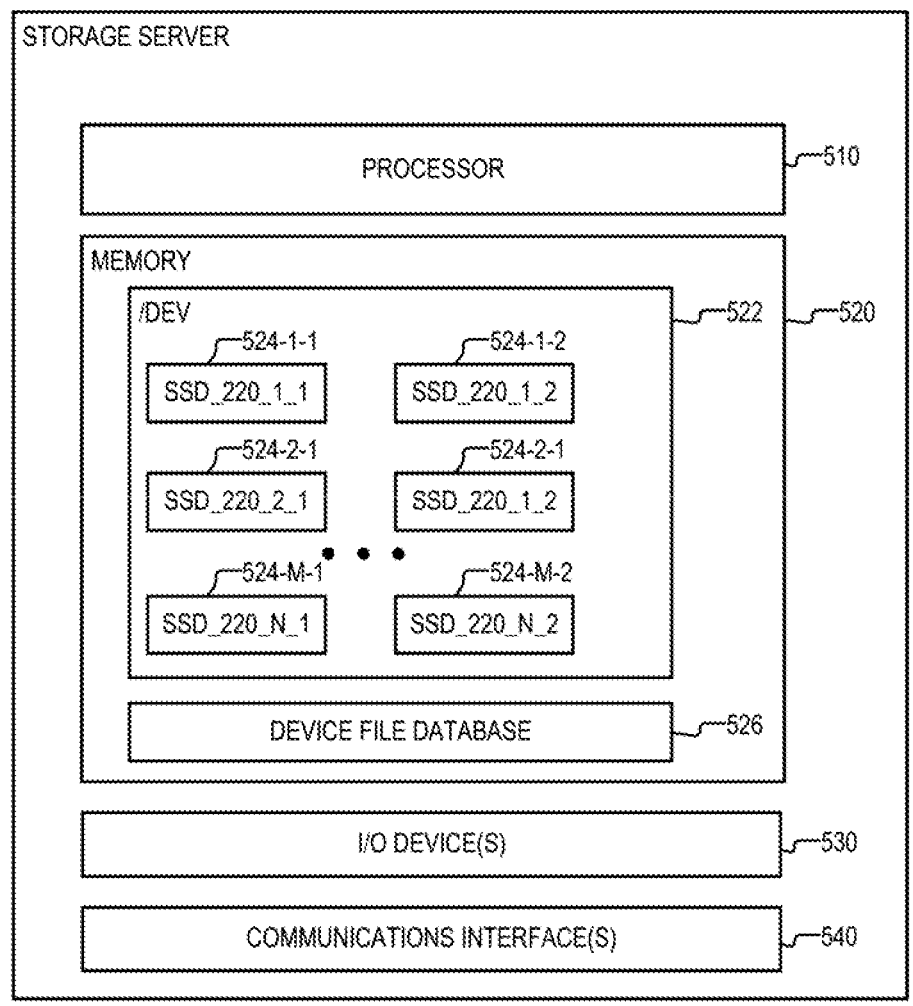
FIG. 5A is a diagram of an example of a storage server, according to aspects of the disclosure.
FIG. 5B is a diagram of an example of a local device file database, according to aspects of the disclosure.

FIG. 5A is a schematic diagram of a storage server 110, according to aspects of the disclosure. As the numbering suggests, the storage server 110 may be the same or similar to any of the storage servers 110-1 through 110-N. The storage server 110 may include a processor 510 that is operatively coupled to a memory 520, I/O device(s) 530, and communications interface(s) 540. The processor 510 may include one or more of a general-purpose processor (e.g., an x86 processor, an ARM-based processor, a MIPS processor), an application-specific integrated circuit (ASIC), a Field-Programmable Gate Array (FPGA), and/or any other suitable type of processing circuitry. The memory 520 may include any suitable type of volatile and/or non-volatile memory. For example, in some implementations, the memory 520 may include one or more of random-access memory (RAM), a read-only memory (ROM), a solid-state drive (SSD), electrically erasable programmable read-only memory (EEPROM), and/or any other suitable type of memory. The I/O device(s) 530 may include one or more of a keyboard, a mouse, a touchpad, a touchscreen, a microphone, a printer, a display device, a speaker, and/or any other suitable type of input or output device. The communications interface(s) 540 may include one or more of a Bluetooth interface, an InfiniBand interface, an Ethernet interface, a WiFi interface, a ZigBee interface, a Universal Serial Bus (USB) interface, and/or any other suitable type of interface.

The memory 520 may be configured to store a device file folder 522. The device file folder 522 may include a system directory that is arranged to store a plurality of device files. More particularly, according to the example of FIG. 5A, for each (or at least one) of the storage devices 220, the device file folder 522 may store at least a first device file and a second device file. For instance, the device file folder 522 may store: (i) a device file 524-1-1 for accessing the storage device 220-1 via a first interface of the storage device 220-1, (ii) a device file 524-1-2 for accessing the storage device 220-1 via a second interface of the storage device 220-1, (iii) a device file 524-2-1 for accessing the storage device 220-2 via a first interface of the storage device 220-2, (iv) a device file 524-2-2 for accessing the storage device 220-2 via a second interface of the storage device 220-2, (v) a device file 524-M-1 for accessing the storage device 220-M via a first interface of the storage device 220-M, and (vi) a device file 524-M-2 for accessing the storage device 220-M via a second interface of the storage device 220-M. In some implementations, at least some of the device files in the device file folder 522 may be provided to the storage server 110 by the management system 120. Additionally or alternatively, in some implementations, at least some of the device files in the device file folder 522 may be generated by the server 110 without the involvement of the management system 120.

The memory 520 may be further configured to store a device file database 526 that is arranged to identify the server's 110 respective primary device file for accessing each of the storage devices 220. As illustrated in FIG. 5B, the database 526 may include a plurality of entries 528. Each of the entries 528 may be associated with a different one of the storage devices 220. Furthermore, each of the entries 528 may identify: (i) a plurality of device files that are available for accessing the entry's associated storage device 220, and (ii) which one of the plurality of device files is designated as the server's 110 primary device file for accessing the storage device. According to the example, of FIG. 5B, the entry 528-1 may identify a first device file and a second device file that are available for accessing the storage device 220-1, and it may indicate that the first device file is currently designated as the server's 110 primary device file for accessing the storage device 220-1. The entry 528-2 may identify a first device file and a second device file that are available for accessing the storage device 220-2, and it may indicate that the second device file is currently designated as the server's 110 primary device file for accessing the storage device 220-2. The entry 528-M may identify a first device file and a second device file that are available for accessing the storage device 220-M, and it may indicate that the first device file is currently designated as the server's 110 primary device file for accessing the storage device 220-M.

Figure 6B:
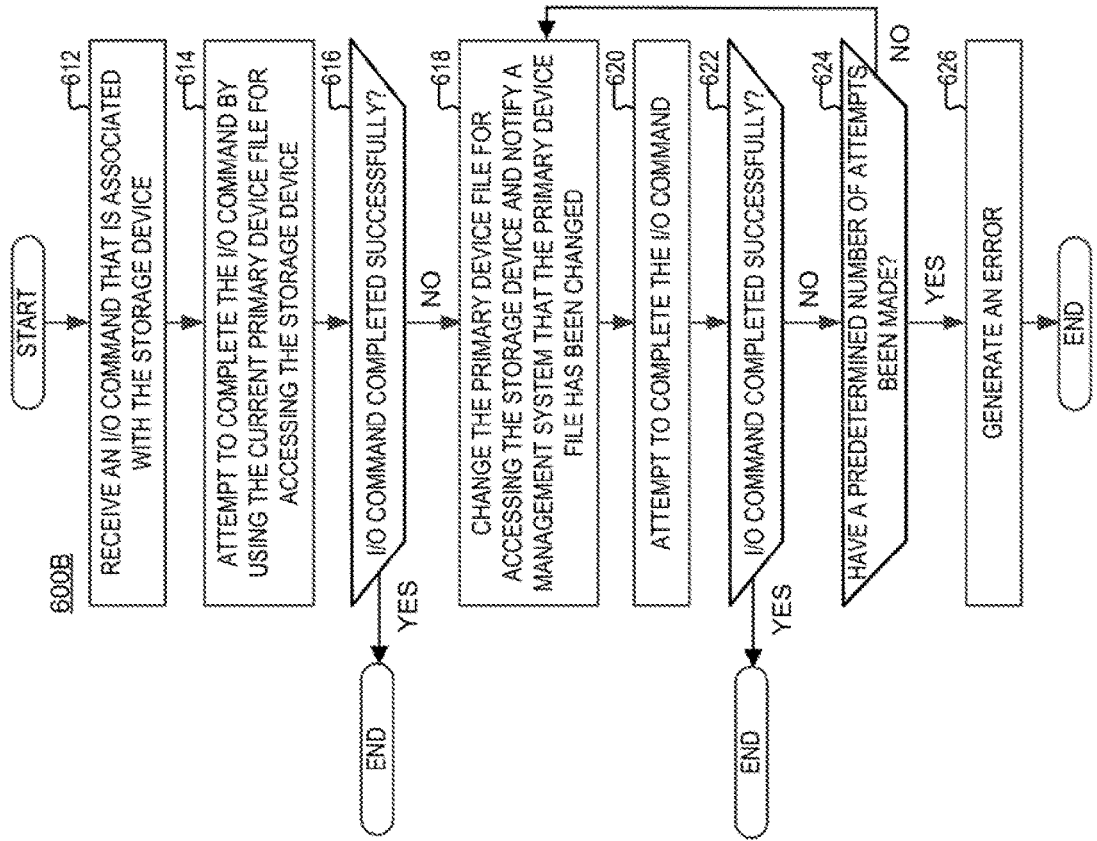
FIG. 6B is a flowchart of an example of a process, according to aspects of the disclosure.
Figure 6A:
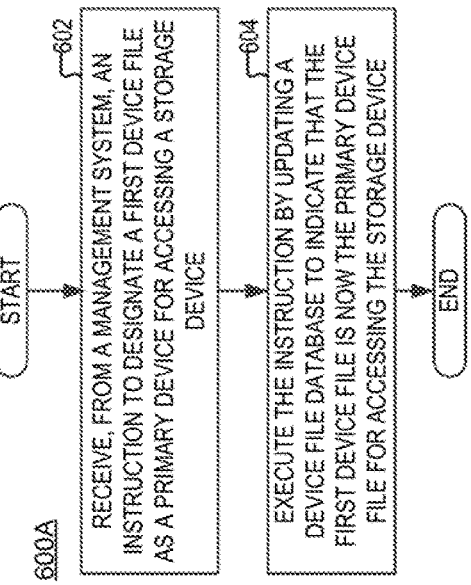
FIG. 6A is a flowchart of an example of a process, according to aspects of the disclosure.

FIG. 6A is a flowchart of an example of a process 600A, according to aspects of the disclosure.

At step 602, the server 110-1 receives from the management system 120 an instruction to designate the device file 524-1-1 as the server 110-1's primary device file for accessing the storage device 220-1. In some implementations, the instruction may include one or more messages that are transmitted by the management system 120. Additionally or alternatively, in some implementations, the instruction may include an identifier corresponding to the storage device (e.g., storage device 220-1) and an identifier corresponding to the device file that is desired (by the management system 120) to be designated as primary. The identifier corresponding to the storage device may include a file path, a filename, and/or any other suitable type of identifier At step 604, the server 110-1 executes the instruction by designating the device file 524-1-1 as its primary device file for accessing the storage device 220-1. More particularly, in some implementations, the server 110-1 may execute the instruction by performing the operations of: (i) retrieving, from the instruction, an identifier of a specified storage device (i.e., storage device 220-1), (ii) retrieving, from the instruction, an identifier of a specified device file (i.e., device file 524-1-1) that is desired to be designated as primary for accessing the specified storage device, (iii) identifying an entry 528-1 in the database 526 that corresponds to the specified storage device (i.e., the entry 528-1-1), and (iv) modifying the identified entry 528-1 to indicate that the specified device file (i.e., device file 524-1-1) is now the server's 110-1 primary device file for accessing the specified storage device (i.e., storage device 220-1).

FIG. 6B is an example of a process 600B, according to aspects of the disclosure At step 612, the server 110-1 receives an I/O command that is associated with the storage device 220-1. The I/O command may include a write command, a read command, and/or any other command, which when executed, causes the storage device 220-1 to perform an action.

At step 614, the server 110-1 attempts to complete the I/O command by using the server's 110-1 current primary device file for accessing the storage device 220-1 (i.e., the device file 524-1-1). In some implementations, the server 110-1 may detect which device file is currently designated as its primary device file for accessing the storage device 220-1 by performing a search of the database 526 and use any device file that is identified as primary (as a result of the search) to complete the I/O command. In some implementations, attempting to complete the I/O command 110-1 may include transmitting to the storage device 220-1 an instruction (e.g., a SCSI instruction), which when executed by the storage device 220-1 would cause to the storage device 220-1 to complete (at least in part) the I/O command. The instruction may be generated and/or transmitted by using the server's 110-1 current primary device file for accessing the storage device 220-1 (i.e., the device file 524-1). The present disclosure is not limited to any specific method for using the server's 110-1 primary device file to access the storage device 220-1. Those of ordinary skill in the art will readily recognize how to use a device file to access a storage device that is represented by the device file as device files are well understood and frequently used in various computing applications.

At step 616, the server 110-1 detects whether the attempt was successful. For example, if the server detects an error that is generated in response to the instruction (transmitted at step 614), the server 110-1 may determine that the attempt was unsuccessful. As another example, if the server 110-1 detects an acknowledgment (generated by the storage device 220-1) indicating that the instruction has been completed successfully, the server 110-1 may determine that the attempt was successful. If the attempt is successful, the process 600B ends. Otherwise, if the attempt is unsuccessful, the process 600B proceeds to step 618.

At step 618, the server 110-1 designates the device file 524-1-2 as the server's 110-1 primary device file for accessing the storage device 110-1. In some implementations, the server 110-1 may designate the device file 524-1 as a primary device file by performing the operations of: (i) identifying an entry 528-1, of the database 526, which corresponds to the storage device associated with the I/O command (i.e., the storage device 220-1), (ii) determining whether any other device files are identified in the entry 528-1 (which are not currently designated as primary), and (iii) if such other device files are identified, modifying the entry 528-1 to indicate that one of the other device files is now designated as the server's 110-1 primary device file for accessing the storage device associated with the I/O command (i.e., the storage device 220-1). In some implementations, after one of the other device files is designated as a primary device file, the server 110-1 may transmit to the management system 120-1 a notification indicating that the other device file has been designated as the server's 110 primary device file for accessing the storage device 220-1. The notification may include an identifier corresponding to the new primary device file.

At step 620, the server 110-1 attempts to complete the I/O command by using its current primary device file for accessing the storage device 220-1 (i.e., the new device file that is designated as primary in step 618)). In some implementations, the server 110-1 may detect which device file is currently designated as its primary device file for accessing the storage device 220-1 by performing a search of the database 526 and use any device file that is identified as primary (as a result of the search) to complete the I/O command. In some implementations, attempting to complete the I/O command 110-1 may include transmitting to the storage device 220-1 an instruction (e.g., a SCSI command), which when executed by the storage device 220-1 would cause to the storage device 220-1 to complete (at least in part) the I/O command. The instruction may be generated and/or transmitted by using the server's 110-1 new primary device file for accessing the storage device 220-1 (i.e., the device file 524-1-2). The present disclosure is not limited to any specific method for using the server's 110-1 primary device file to access the storage device 220-1. Those of ordinary skill in the art will readily recognize how to use a device file to access a storage device that is represented by the device file as device files are well understood and frequently used in various computing devices.

At step 622, the server 110-1 detects whether the attempt (made at step 620) is successful. Step 622 may be performed in the same or similar manner to step 616. If the attempt is successful, the process 600B ends. Otherwise, if the attempt is unsuccessful, the process 600B proceeds to step 620.

At step 624, the server 1107-1 determines if a predetermined number of attempts to complete the I/O command have been made already. If a predetermined number of attempts have been made already, no further attempts are made to complete the I/O command, and the process 600B proceeds to step 622. Otherwise, the process 600B returns to step 614, and another attempt is made.

At step 626, the server 110-1 generates an error.

FIGS. 6A-B are provided as an example only. Although in the example of FIGS. 6A-B, process 600A-B are performed by the server 110-1, it will be understood that any storage node in the storage system. As used throughout the disclosure, the term "storage node" may refer to at least one of: (i) storage server 110, or (ii) a particular process or thread that is executed on the storage server 110, which is configured to execute I/O commands. As used throughout the disclosure, the term I/O command may refer to an I/O request that is received at a node in the storage system 100 from client device that is external to the storage system 100 or an internal command that is generated by one or more nodes in the storage system 100 based on an I/O request that is received at the storage system 100 from a client device that is external to the storage system 100.

According to the example of FIG. 6B, device files 524-1-1 and 524-1-2 are both stored in the memory of the server 110-1. According to the example of FIG. 6B, the server 110-1 switches between using one of the device files 524-1-1 and 524-1-2 as a primary device file for accessing the storage device 220-1. Notably, the switch can be performed autonomously—e.g., without requesting permission or obtaining any data, such as a device file or a device file identifier, from the management system 120 before the switch is accomplished. In some respects, the autonomous switching between using one of the device files 524-1-1 and 524-1-2 as a primary device file is advantageous because it increases the speed at which the server 110-1 can find an alternative path (e.g., in the switching fabric 210) for completing an I/O command in the event of an error. The error may be caused by a failure or congestion in the switching fabric 210 and or another failure of the path used by the server 110-1 for accessing the storage device 220-1. In this regard, the process 600B may increase the speed at which the server 110-1 recovers from data path errors and increases the speed at which an I/O command is completed. In some implementations, to further increase the speed at which the I/O command is completed, when the primary device file for accessing the storage device 220-1 is changed, the server may first re-attempt to complete an I/O file with the new primary device file, and then notify the management system 120 that the primary device file has been changed. More specifically, in some respects, the process 600B may help increase the speed at which the server 110-1 can recover from failures in the data path used by the server 110-1 to access the storage device 220-1.

In some implementations, only one device file may be designated as the server's 110-1 primary device file for accessing the storage device 220-1. In this regard, designating a device file as the server's 110-1 primary device file for accessing the storage device 220-1 may cause the device file, which, up to this point, is the primary device file for accessing the storage device 220-1, to be no longer designated as the server's 110-1 primary device file for accessing the storage device 220-1. For instance, the entry 528-1-1 may include a field that identifies the server's 110 primary device file for accessing the storage device 220-1. When a new primary device file is designated, the contents of the field may be deleted and replaced with an identifier of the new primary device file. Additionally or alternatively, in some implementations, multiple device files may be designated as the server's 110 primary device file for accessing a given storage device 220.

As noted above, the server 110-1 may detect that an attempt to complete an I/O command is unsuccessful when an error is generated in response to a storage device instruction associated with the I/O command. In this regard, it will be understood, the present disclosure is not limited to any specific way of detecting the error. For instance, detecting the error may include detecting a time out event, detecting an interrupt, detecting an error message, etc. As noted above, the server 110-1 uses a database 526 to identify the primary device for the storage device 220-1. In this regard, it will be understood that the term "database", as used through the disclosure shall be interpreted as referring to any data structure, or a plurality of data structures, (e.g., files or other objects, etc.) that are used to store configuration settings for the server 110-1.

Figure 7:
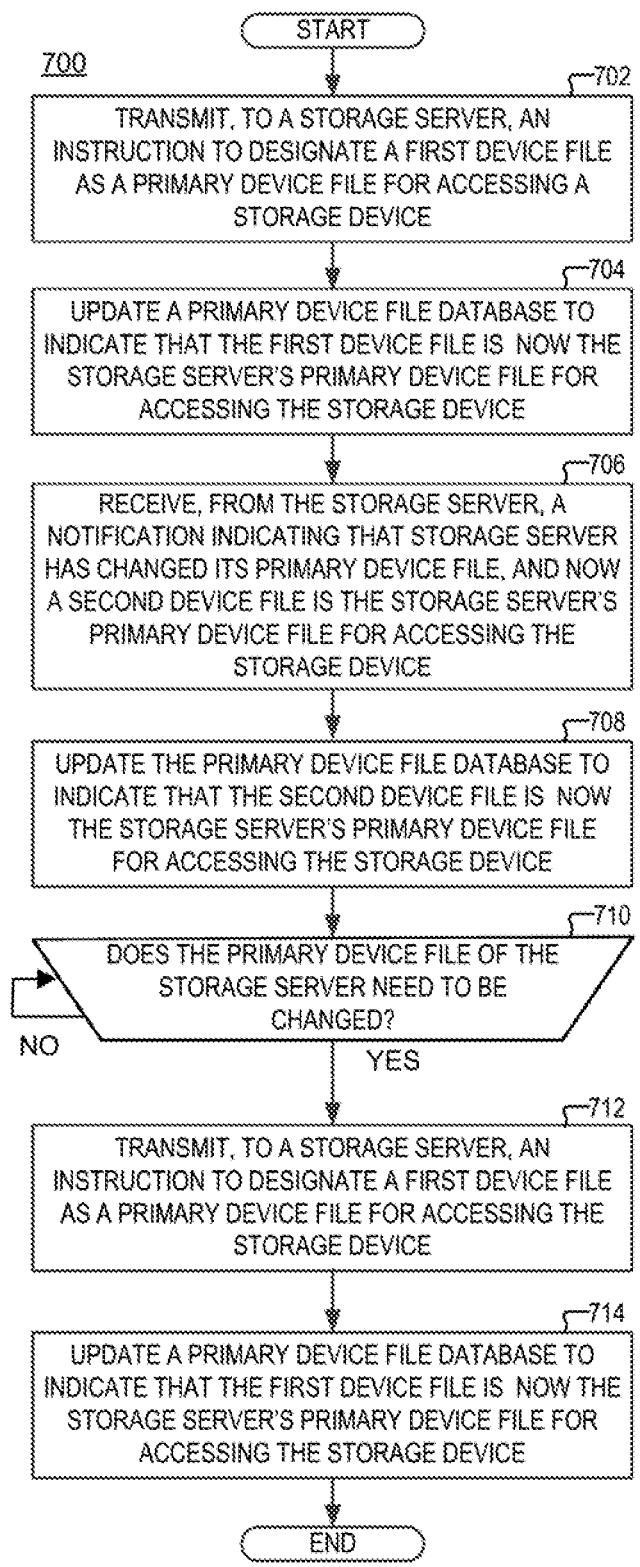
FIG. 7 is a flowchart, of an example of a process, according to aspects of the disclosure.

FIG. 7 is a flowchart of an example of a process 700, according to aspects of the disclosure.

At step 702, the management system 120 transmits to the server 110-1 a first instruction to designate the device file 524-1-1 as the server's 110-1 primary device file for accessing the storage device 220-1. In some implementations, the instruction may include one or more messages that are transmitted by the management system 120. Additionally or alternatively, in some implementations, the first instruction may include an identifier corresponding to the storage device (e.g., storage device 220-1) and an identifier corresponding to the device file that is desired (by the management system 120) to be designated as primary.

At step 704, the management system 120 updates the database 422 to indicate that the device file 524-1 is now the server's 110-1 primary device for accessing the storage device.

At step 706, the management system 120 receives a notification from the server 110-1 indicating that the server 110-1 has designated the device file 524-1-2 as the server's 110-1 primary device file for accessing the storage device 220-1.

At step 708, in response to the notification, the management system 120 updates the database 422 to indicate that the device file 524-1-2 is now the server's 110-1 primary device for accessing the storage device 220-1.

At step 710, the management system 120 detects whether the primary device file of the server 110-1 for accessing the storage device 220-1 needs to be changed. By way of example, in some implementations, the management system 120 may detect that the primary device file of the server 110-1 for accessing the storage device 220-1 needs to be changed when more than a predetermined number of errors are generated when the device file that is designated as primary for the server 110-1 (i.e., device file 524-1-2) is used to access the storage device 220-1. However, it will be understood that the present disclosure is not limited to any specific criterion for determining whether the primary device file of the server 110-1 for accessing the storage device 220-1 needs to be changed. If the primary device needs to be changed, the process 700 proceeds to step 712. Otherwise, step 710 is repeated.

At step 712, the management system 120 transmits to the server 110-1 a second instruction to designate the device file 524-1-1 as the server's 110-1 primary device file for accessing the storage device 220-1. In some implementations, the instruction may include one or more messages that are transmitted by the management system 120. Additionally or alternatively, in some implementations, the second instruction may include an identifier corresponding to the storage device 220-1 and an identifier corresponding to the device file 524-1-1.

At step 714, the management system 120 updates the database 422 to indicate that the device file 524-1 is currently the server's 110-1 primary device for accessing the storage device 220-1.

FIG. 7 is provided as an example only. Although in the example of FIG. 7 the primary device file of the server 110-1 for accessing the storage device 220-1 is being changed, it will be understood that the process 700 may be used to change the primary device file for accessing the storage device 220-1 of any of the servers 110 in the storage system 100. Although in the example of FIG. 7 the primary device file for accessing the storage device 220-1 is changed, it will be understood that the process 700 can be used to change the primary device file for any of the storage devices 220.

FIGS. 1-7 are provided as an example only. At least some of the steps discussed with respect to FIGS. 1-7 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied wider any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims. (final)

The invention claimed is:

1. A method comprising:
receiving, by a first storage node, a first instruction to designate a first device file as the first storage node's primary device file for accessing a storage device, the first instruction being received from a management system;
designating, by the first storage node, the first device file as the first storage node's primary device file for accessing the storage device, the first device file being designated as the first storage node's primary device file for accessing the storage device in response to the first instruction;

receiving, at the first storage node, an I/O command that is associated with the storage device;

making, by the first storage node, a first attempt to complete the I/O command by using the first device file to access the storage device, the first device file being selected for use in the first attempt based on the first device file being designated as the storage node's primary device file for accessing the storage device, detecting, by the first storage node, an error that is generated in response to the first attempt;

designating, by the first storage node, a second device file as the first storage node's primary device file for accessing the storage device, the second device file being designated as the first storage node's primary device file for accessing the storage device in response to the error, the designation of the second device file as the first storage node's primary device file being performed autonomously of the management system; and making a second attempt to complete the I/O command by using the second device file, the second device file being selected for use in the second attempt based on the second device file being designated as the first storage node's primary device file for accessing the storage device, wherein each of the first device file and each of the second device file is associated with a different interface of the storage device.

2. The method of claim 1, wherein only one of the first device file and the second device file is designated as the first storage node's primary device file for accessing the storage device at any given time during an operation of the first storage node.

3. The method of claim 1, wherein both the first device file and the second device file are stored in a memory of the first storage node at any given time during an operation of the first storage node.

4. The method of claim 1, wherein:
designating the first device file as the first storage node's primary device file for accessing the storage device includes causing a configuration setting of the first storage node to indicate that the first device file is the first storage node's primary device file for accessing the storage device; and designating the second device file as the first storage node's primary device file for accessing the storage device includes causing the configuration setting to indicate that the second device file is the first storage node's primary device file for accessing the storage device.

5. The method of claim 1, further comprising transmitting, from the first storage node to the management system, a notification that the second device file has been designated as the first storage node's primary device file for accessing the storage device.

6. The method of claim 5, wherein the notification is transmitted to the management system after the second attempt is made.

7. The method of claim 5, wherein
the management system is configured to maintain a database including at least (i) a first entry that identifies the first storage node's primary device for accessing the storage device, and (ii) a second entry that identifies a second storage node's primary device file for accessing the storage device; and in response to receiving the notification, the management system is configured to update the first entry to indicate that the second device file is the first storage node's primary device file for accessing the storage device.

8. An apparatus comprising:
a memory storing at least a first device file for accessing a storage device and a second device file for accessing the storage device; and at least one processor that is operatively coupled to the memory, the at least one processor being configured to perform the operations of:

receiving a first instruction to designate a first device file as a primary device file for accessing a storage device, the first instruction being received from a management system;

designating the first device file as a primary device file for accessing the storage device, the first device file being designated as a primary device file for accessing the storage device in response to the first instruction;

receiving an I/O command that is associated with the storage device;

making a first attempt to complete the I/O command by using the first device file to access the storage device, the first device file being selected for use in the first attempt based on the first device file being designated as the primary device file for accessing the storage device, detecting an error that is generated in response to the first attempt;

designating a second device file as the primary device file for accessing the storage device, the second device file being designated as a primary device file for accessing the storage device in response to the error, the designation of the second device file as the first storage node's primary device file being performed autonomously of the management system; and making a second attempt to complete the I/O command by using the second device file, the second device file being selected for use in the second attempt based on the second device file being designated as the primary device file for accessing the storage device, wherein each of the first device file and each of the second device file is associated with a different interface of the storage device.

9. The apparatus of claim 8, wherein only one of the first device file and the second device file is designated as a primary device file for accessing the storage device.

10. The apparatus of claim 8, wherein the at least one processor further configured to perform the operation of receiving the first device file and the second device file from the management system.

11. The apparatus of claim 8, wherein:
designating the first device file as a primary device file for accessing the storage device includes causing a configuration setting of the apparatus to indicate that the first device file is a primary device file for accessing the storage device; and designating the second device file as a primary device file for accessing the storage device includes causing the configuration setting to indicate that the second device file is a primary device file for accessing the storage device.

12. The apparatus of claim 8, the at least one processor is further configured to perform the operation of transmitting, to the management system, a notification that the second device file has been designated as a primary device file for accessing the storage device.

13. The apparatus of claim 12, wherein the notification is transmitted to the management system after the second attempt is made.

14. A storage system, comprising:
a management system; and
a first storage node that is configured to perform the operations of:
receiving a first instruction to designate a first device file as the first storage node's primary device file for accessing a storage device, the first instruction being received from the management system;
designating the first device file as the first storage node's primary device file for accessing the storage device, the first device file being designated as the first storage node's primary device file for accessing the storage device in response to the first instruction;
receiving an I/O command that is associated with the storage device;
making, by the first storage node, a first attempt to complete the I/O command by using the first device file to access the storage device, the first device file being selected for use in the first attempt based on the first device file being designated as the storage node's primary device file for accessing the storage device,
detecting an error that is generated in response to the first attempt;
designating a second device file as the first storage node's primary device file for accessing the storage device, the second device file being designated as the first storage node's primary device file for accessing the storage device in response to the error, the designation of the second device file as the first storage node's primary device file being performed autonomously of the management system; and
making a second attempt to complete the I/O command by using the second device file, the second device file being selected for use in the second attempt based on the second device file being designated as the first storage node's primary device file for accessing the storage device,
wherein each of the first device file and each of the second device file is associated with a different interface of the storage device.

15. The storage system of claim 14, wherein only one of the first device file and the second device file is designated as the first storage node's primary device file for accessing the storage device at any given time during an operation of the first storage node.

16. The storage system of claim 14, wherein both the first device file and the second device file are stored in a memory of the first storage node at any given time during an operation of the first storage node.

17. The storage system of claim 14, wherein:
designating the first device file as the first storage node's primary device file for accessing the storage device includes causing a configuration setting of the first storage node to indicate that the first device file is the first storage node's primary device file for accessing the storage device; and
designating the second device file as the first storage node's primary device file for accessing the storage device includes causing a configuration setting of the storage system to indicate that the second device file is the first storage node's primary device file for accessing the storage device.

18. The storage system of claim 14, wherein the first storage node is configured to perform the operation of transmitting, to the management system, a notification that the second device file has been designated as the first storage node's primary device file for accessing the storage device.

19. The storage system of claim 18, wherein the notification is transmitted to the management system after the second attempt is made.

20. The storage system of claim 18, wherein the management system is configured to perform the operations of:
storing, in a memory of the management system, a database including at least (i) a first entry that identifies the first storage node's primary device for accessing the storage device, and (ii) a second entry that identifies a second storage node's primary device file for accessing the storage device; and
in response to receiving the notification, updating the first entry to indicate that the second device file is the first storage node's primary device file for accessing the storage device.

* * * * *